(12) United States Patent
Wickland

(10) Patent No.: US 8,758,488 B1
(45) Date of Patent: Jun. 24, 2014

(54) METHOD OF FABRICATING AND DEVICES EMPLOYING VENTS

(75) Inventor: Terry J. Wickland, Evergreen, CO (US)

(73) Assignee: Nuclear Filter Technology, Inc., Golden, CO (US)

(*) Notice: Subject to any disclaimer, the term of this patent is extended or adjusted under 35 U.S.C. 154(b) by 0 days.

(21) Appl. No.: 13/373,755

(22) Filed: Mar. 26, 1999

Related U.S. Application Data

(63) Continuation of application No. PCT/US97/17601, filed on Sep. 29, 1997.

(51) Int. Cl.
*B01D 53/22* (2006.01)

(52) U.S. Cl.
USPC .......... 96/4; 55/385.4; 95/45; 96/7; 96/9; 96/11

(58) Field of Classification Search
USPC .......... 55/385.4; 95/45; 96/4, 7, 9, 11
See application file for complete search history.

(56) References Cited

U.S. PATENT DOCUMENTS

| | | | | |
|---|---|---|---|---|
| 3,042,574 A * | 7/1962 | Hochberg | ........ | 156/286 |
| 3,951,293 A * | 4/1976 | Schulz | ........ | 215/261 |
| 4,756,852 A * | 7/1988 | Temus | ........ | 588/16 |
| 4,934,545 A * | 6/1990 | Pezzoli et al. | ........ | 215/250 |
| 4,957,518 A * | 9/1990 | Brassell | ........ | 96/4 |
| 5,125,522 A * | 6/1992 | Pezzoli et al. | ........ | 215/250 |
| 5,593,395 A * | 1/1997 | Martz | ........ | 604/304 |
| 5,720,789 A * | 2/1998 | Pinson | ........ | 55/364 |
| 5,744,697 A * | 4/1998 | Martell et al. | ........ | 73/31.06 |
| 5,782,383 A * | 7/1998 | Robinson | ........ | 222/81 |
| 5,988,426 A * | 11/1999 | Stern | ........ | 220/371 |
| 6,199,979 B1 * | 3/2001 | Hobson et al. | ........ | 347/93 |
| 6,709,493 B2 * | 3/2004 | DeGuiseppi et al. | ........ | 96/7 |
| 6,842,330 B2 * | 1/2005 | Farahmandi et al. | ........ | 361/502 |
| 7,078,228 B2 * | 7/2006 | Lacey et al. | ........ | 435/288.1 |
| 7,473,302 B2 * | 1/2009 | Ueda | ........ | 96/6 |
| 7,753,491 B2 * | 7/2010 | Silverbrook | ........ | 347/54 |
| 7,981,099 B2 * | 7/2011 | Butler | ........ | 604/333 |
| 2002/0094533 A1 * | 7/2002 | Hess et al. | ........ | 435/6 |
| 2003/0167064 A1 * | 9/2003 | Whayne | ........ | 606/153 |
| 2004/0168417 A1 * | 9/2004 | Tanaka et al. | ........ | 55/486 |
| 2006/0085080 A1 * | 4/2006 | Bechgaard et al. | ........ | 623/23.43 |

\* cited by examiner

*Primary Examiner* — Jason M Greene
*Assistant Examiner* — Anthony Shumate
(74) *Attorney, Agent, or Firm* — Millen, White, Zelano & Branigan, P.C.

(57) ABSTRACT

Vents for containers include a perforated substrate portion (20) of polymer material over which is thermally bonded a gas permeable membrane (30). The thermal bond (31) is direct and adhesive-free so that there is no adhesive available for chemical attachment by materials within the containers (58) and no opportunity for an adhesive to interfere with or block perforations through the substrate.

13 Claims, 5 Drawing Sheets

METHOD OF FABRICATING AND DEVICES EMPLOYING VENTS

This application is a continuation of PCT/US97/17601, filed Sep. 29, 1997, which claims priority from U.S. application Ser. No. 08/721,967, filed Sep. 27, 1996.

FIELD OF THE INVENTION

The present invention is directed to vents, methods of fabricating vents and devices employing vents. More particularly, the present invention is related to vents which prohibit passage of liquids therethrough and allow passage of gases, wherein the vents are of particular interest with respect to venting containers having fluids therein which are hazardous.

BACKGROUND OF THE INVENTION

Materials stored in containers frequently have both a liquid phase and a gas phase. With materials such as hazardous materials, it is frequently desirable to allow gas phases to vent while retaining liquid phases in the container.

An example of such hazardous materials is plutonium in aqueous hydrochloric acid or nitric acid solutions. As pipes and tanks containing these solutions are drained, they are generally drained into 1 gallon, high density, polyethylene bottles with polypropylene caps for interim storage until permanent solidification or immobilization may be conducted. The solutions contain as much as 140 g/l of plutonium which has the radiolytic effect of generating hydrogen gas. Hydrogen gas in the bottles accelerates embrittlement of the bottles which, over time, can lead to failure of the bottles. Since plutonium is considered to be highly carcinogenic, leak-age of plutonium into the environment surrounding the bottles poses a danger which must be avoided. Typically, venting of these bottles is through a GOR-TEX® element in the polypropylene cap. GOR-TEX® is impervious to liquids but pervious to gases. It has proven difficult to select an adhesive for securing the GOR-TEX® material to the caps because many adhesives tend to degrade in the presence of aqueous hydrochloric and nitric acid solutions containing plutonium.

This concern arises with respect to other structures such as the filter assembly disclosed in U.S. Pat. No. 4,957,518 in which a GOR-TEX®, liquid permeable, but gas impermeable, barrier is employed. In this patent, the GOR-TEX® barrier may be held in place either mechanically or by an adhesive. Mechanical retention relies on clamping the GOR-TEX® barrier between two surfaces. Clamping can be unreliable. The other approach is, of course, to use adhesive, but, as previously stated, adhesive may be attacked by the material stored in the containers. In addition, there are fabrication problems which arise when using adhesive. This is because if a perforated substrate is used to support the GOR-TEX® barrier, the adhesive may flow over into and seal at least some or not all of the perforations.

In view of the aforementioned problems, as well as other problems, there is a need for new and improved vent structures; a need for a method for fabricating such structures; and a need for vent configurations employing the advantages offered by the improved vents.

SUMMARY OF THE INVENTION

It is a feature of the present invention to provide new and improved vents which are gas permeable and liquid impermeable; to provide a new and improved method of making such vents, and to provide new and improved structures utilizing the advantages of such vents.

In view of the aforementioned features, and other features, the present invention is directed to a lamination comprising polytetrafluoroethylene (PTFE) which is thermally bonded to a stiff, perforated substrate of resinous material.

A method of making a composite structure including a perforated substrate of resinous material and a layer of polytetrafluoroethylene (PTFE) comprises thermally bonding the layer of PTFE to the perforated substrate.

In a more specific aspect, the perforated substrate is porous and, in still a further aspect of the invention, the perforated substrate has discrete passages therethrough.

In a configuration for employing the previously described vent in accordance with the present invention, the vent is fabricated in a closure wherein the closure is a bottle cap or where the enclosure is an assembly for venting flexible containers such as bags.

In still a further aspect of the invention and further illustrative of the breadth of the invention, a vent configured in accordance with the principles of the present invention is used housings, such as the housings for battery cover electrical transformers to vent potentially explosive gases from the housings.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
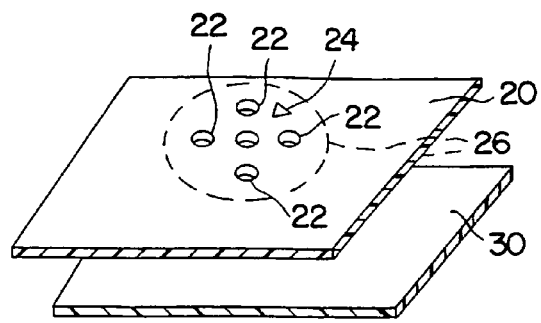
FIG. 1 is a perspective view showing a polymer material substrate and a layer of polytetrafluoroethylene (PTFE)

Referring now to FIG. 1, there is shown a substrate 20 of a polymer material such as polyurethane, polypropylene, polyethylene, fiber glass reinforced polyethylene or other polymer materials. The substrate 20 is perforated by at least one discrete through hole 22 or by an array 24 of discrete through holes. Alternatively, the perforated substrate 20 is in the form of a stiff porous structure without discrete through holes, wherein fluids can migrate from a first side 26 to a second side 28 of the stiff substrate. In a preferred embodiment of the invention, the substrate 20 is stiff as opposed to flexible and the polymer material is a unitary mass rather than a stranded fabric, the substrate 20 preferably having the configuration of a plate.

Figure 2:
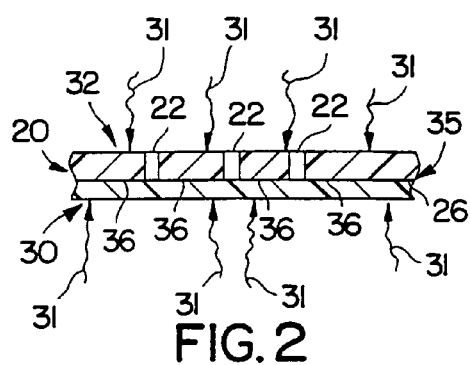
FIG. 2 is a side elevation showing the PTFE layer being thermally bonded to the perforated substrate.

As is shown in FIG. 2, a layer of polytetrafluoroethylene (PTFE), in the form of a membrane 30 such as one of the membranes identified by the trademark GOR-TEX® and disclosed in U.S. Pat. No. 3,953,566, is thermally bonded to the substrate 20. GOR-TEX® membranes are available from G.L. Gore and Associate, Inc., Elkton, Md., and are discussed in U.S. Pat. No. 5,264,276, issued Nov. 23, 1993, incorporated herein by reference.

Figure 3:
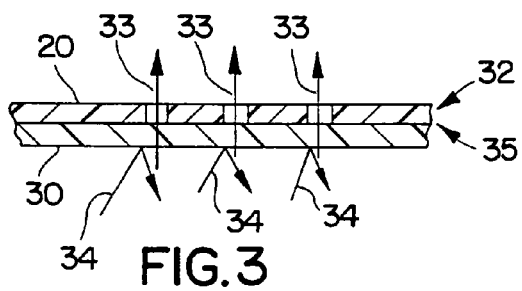
FIG. 3 is a side elevation showing gas or vapors passing through the lamination of FIG. 2 and liquids being repelled by the lamination.

In thermal bonding, sufficient heat and pressure (indicated by arrows 31) are applied to the substrate 20 and the membrane 30 to cause thermal adhesion without unduly restricting the diameters of the discrete holes 22 or the hydrophobic characteristics of membrane 30, wherein the resulting lamination 32 is permeable to gas and vapor 33, but impermeable to liquid 34 (as is seen in FIG. 3). In bonding a membrane 30 to a polypropylene substrate 20, low pressure is applied where the GOR-TEX® membrane is rested against the substrate with slight pressure to insure engagement. The bonding temperature is in the range of about 150° C. to about 200° C. and is applied for about 0.5 to 15 minutes.

By thermally bonding the GOR-TEX® membrane 30 to the perforated substrate 20, no adhesive is required at the interface 35 of the GOR-TEX® membrane 30 and perforated substrate 20. Accordingly, there is no additional adhesive which can be degraded by whatever substance is present in the liquid repelled by the GOR-TEX® membrane. Moreover, the possibility is removed of closing the openings of the discrete through holes 22 by adhesive flowing from areas 36 adjacent the holes into interference with the holes. This difficulty can occur either during application of an adhesive or upon pressing the membrane 30 into engagement with the first surface 26 of the substrate 20.

Figure 4:
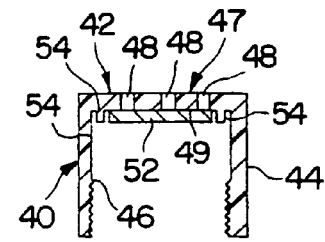
FIG. 4 is a side elevation of a bottle closure or cap utilizing the principles of the present invention as shown in FIG. 3.
Figure 5:
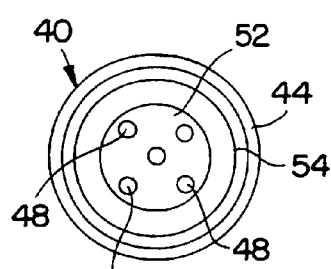
FIG. 5 is a bottom view of the closure or cap.
Figure 6:
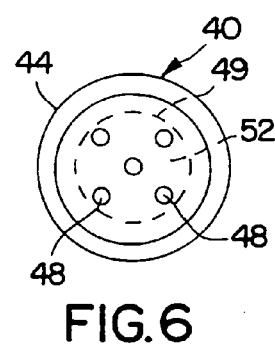
FIG. 6 is a top view of the closure or cap of FIGS. 4 and 5.

Referring now to FIGS. 4-6, there is shown a closure such as a bottle cap 40 employing the principles of the present invention. The bottle cap 40 is made up of a relatively stiff polymer material such as polypropylene and includes top 42 and a cylindrical rim 44 having threads 46 for tight engagement with the neck of a bottle. The top 42 has an array 47 of discrete holes 48 therethrough. Heat bonded to the inner surface 49 of the top 42 is a GOR-TEX® membrane 52 and surrounding the GOR-TEX® membrane 52 is an annular lip 54.

Figure 7:
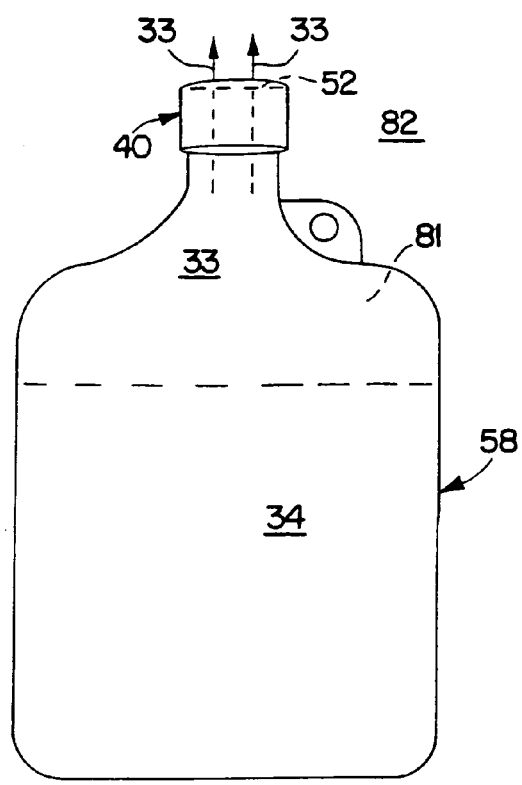
FIG. 7 is a side view of a container utilizing the cap of FIGS. 4-6 which employs the vent of FIG. 3, fabricated in accordance with the methods of FIGS. 1 and 2.

As is seen in FIG. 7, the cap 40 is threaded onto the neck 56 of a polyethylene container 58 which contains material therein in the liquid phase 34 and the gas phase 33. The GOR-TEX® membrane 52 allows the gas phase 33 to vent or leave the container 58 while preventing the liquid phase 34 from leaving the container. Moreover, the GOR-TEX® membrane 52 prevents liquid from outside the container 58 from entering the container while allowing the relatively free exchange of air, or another surrounding gas, into and out of the container 58.

Figure 8:
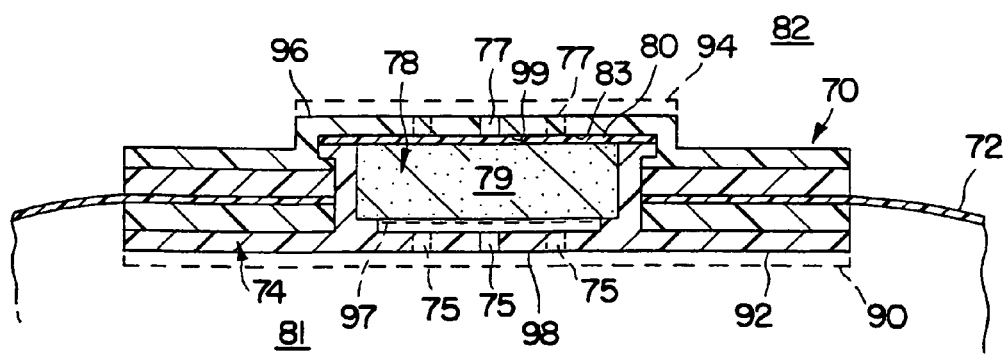
FIG. 8 is a side elevation of a vent assembly utilizing the vent of FIG. 3.
Figure 9:
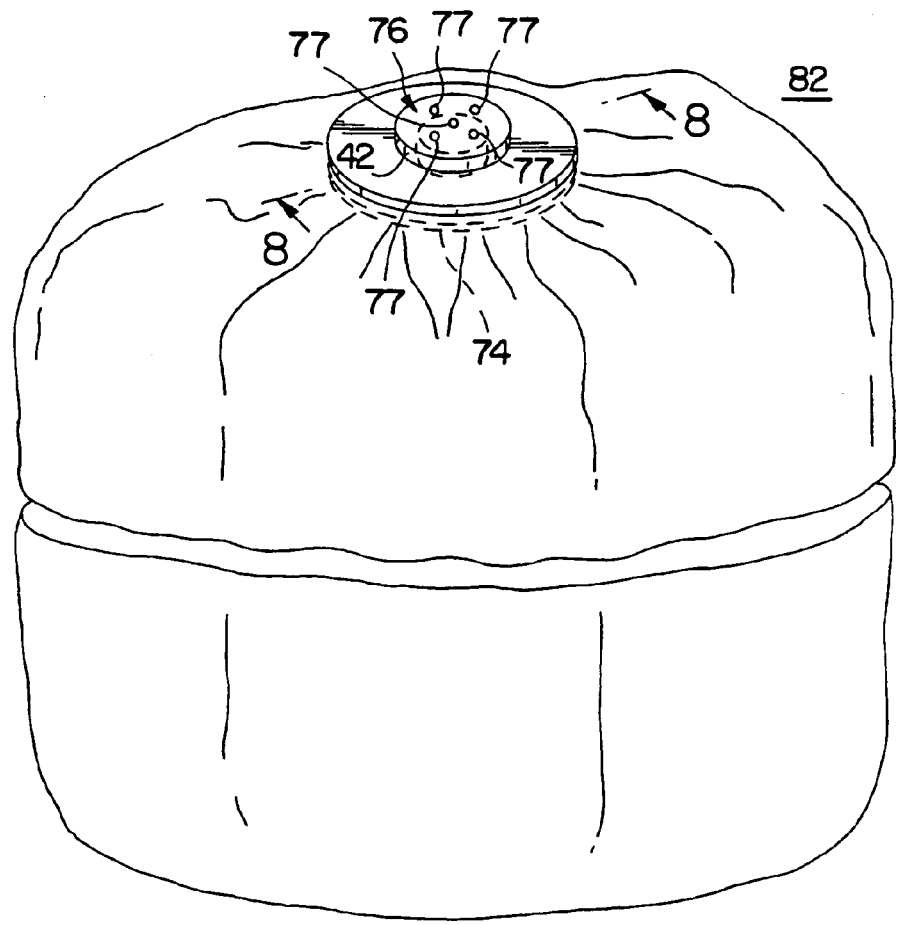
FIG. 9 is a side, perspective view of a bag employing the vent assembly of FIG. 8.

Referring now to FIG. 8, there is shown another vent configuration 70 of the present invention. The vent configuration 70 has the general configuration of the vent assembly disclosed in U.S. Pat. No. 4,957,518, issued Sep. 18, 1990, and incorporated herein by reference. Vent assembly 70 is used to vent a bag 72 which contains radioactive waste materials or other hazardous waste materials. The vent assembly generally comprises a stiff but resilient base 74 having discrete holes 75 therein and a stiff but resilient cover 76 having discrete holes 77 therein. The cover 76 snaps into engagement with a rim on the walls of a chamber 78 containing a disk 79 of filter materials such as carbon-carbon filter material. In order to render the vent 78 gas permeable and liquid impermeable, a GOR-TEX® membrane 80 is interposed between the interior 81 of the bag 72 and the surrounding environment 82.

In accordance with one embodiment of the present invention, the GOR-TEX® membrane 80 is heat bonded to the bottom surface 83 of the cap 76 to cover the discrete holes 77. In still another approach, a GOR-TEX® membrane 97 is bonded to the base 74 between the filter element 79 and the base. In an alternative embodiment, a GOR-TEX® membrane 90 is thermally bonded to the bottom surface 92 of the base 74. In still another approach, the GOR-TEX® membrane 94 is thermally bonded to the upper surface 96 of the cover 76 in order to overlie the discrete through holes 77. In various embodiments and configurations, the GOR-TEX® membranes 80, 90 and 94 may all be employed, only the membranes 90 and 92 may be used or just the membranes 80 and 94 may be used. In any of the embodiments, an advantage of having at least one of the membranes 80, 90 and 94 thermally bonded to the base 74 or cover 76 is that the membranes are bonded in areas 98 between the discrete through holes 75 or areas 99 between the through holes 77. Such bonding over the entire interface substantially enhances the mechanical strength of the vent assembly. This is accomplished without depositing an adhesive in the areas 98 and 99 between the discrete through holes 77 and 75 which adhesive might interfere with or cover the openings of the holes.

Figure 10:
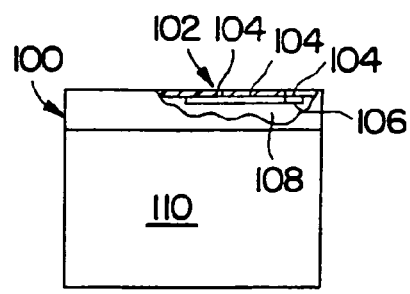
FIG. 10 is a side elevation of a housing for an electrical transformer employing a vent such as the vent of FIG. 3.

Referring now to FIG. 10, there is shown another embodiment of the invention, wherein a battery cover transformer housing 100 of a polypropylene material reinforced with fiberglass has a perforated area 102 with discrete holes 104 therethrough, which perforated area is covered by a GOR-TEX® membrane 106 that is thermally bonded to the perforated area. Accordingly, excessive pressure buildup within the transformer housing 100 due to generation of dangerous gases 108 is avoided while retaining dielectric liquid 110 within the transformer housing.

Figure 11:
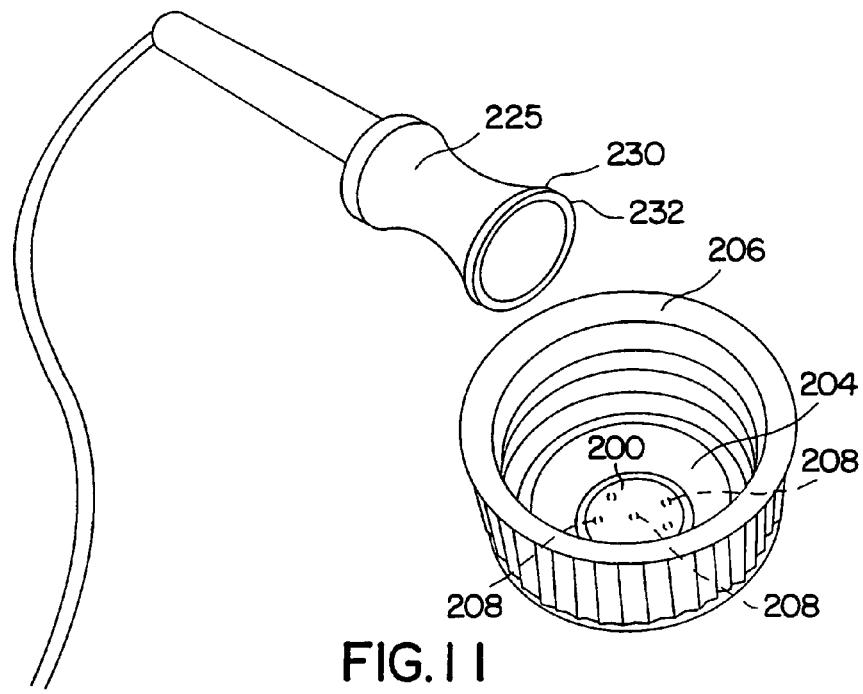
FIG. 11 is a perspective view showing a electric iron which is used to thermally stake a layer of PTFE over a perforated portion of a large container cap.
Figure 12:
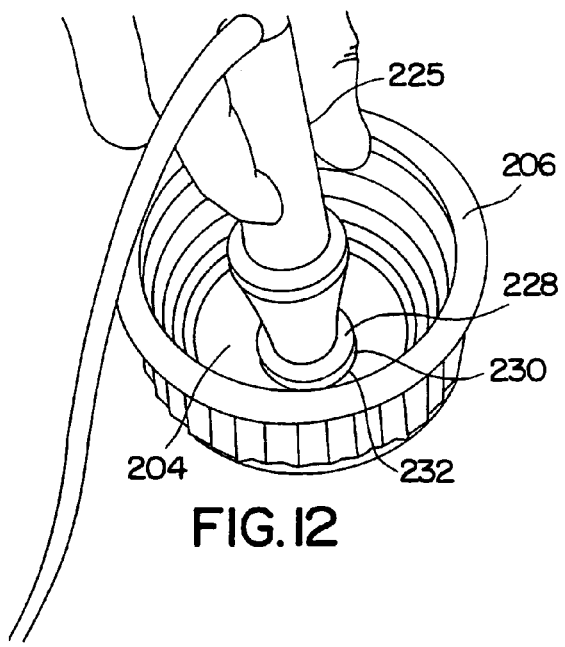
FIG. 12 is a view similar to FIG. 11, but showing the electric iron applying heat to the PTFE layer.
Figure 13:
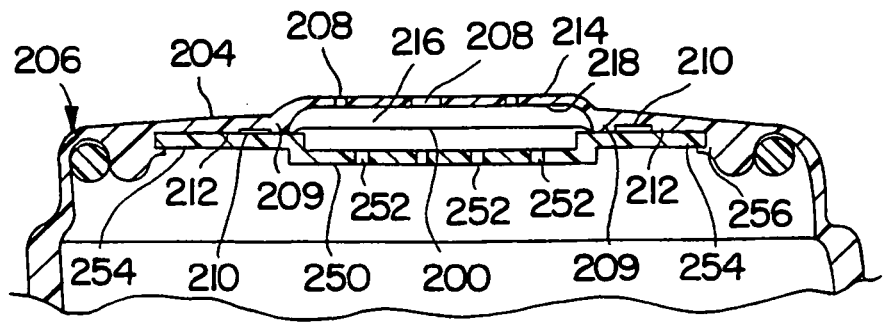
FIG. 13 is a side elevation showing the top portion of the cap of FIGS. 11 and 12 with a perforated cover snap fitted over the PTFE layer.

Referring now to FIGS. 11-13, there is shown a preferred method of heat bonding a GOR-TEX® membrane 200 to the inside surface 202 of the top 204 of a screw-on cap 206 in order to cover perforations 208. As is best seen in FIG. 13, the inside surface 202 of the cap top 204 includes a first rib 209. The first rib 209 is surrounded by a second rib 210 which creates an annular channel 212 around the perforations 208. Preferably, the perforations 208 are in a raised area 214 of the top 204 so that there is a slight air gap 216 between the GOR-TEX® layer 200 and the inside surface 218 of the top 204 of the cap.

The GOR-TEX® layer 200 has a peripheral portion 220 which is secured in the annular trough 210 by heat staking with an iron 225 (FIGS. 11 and 12). The iron 225 includes a head 228 that has a projecting rim 230 with an annular edge 232 which corresponds in diameter to the annular trough 210. As is seen in FIG. 12, when the annular edge 232 of the heated head 228 is pressed against the peripheral portion 220 of the GOR-TEX® layer 200, it fuses with the polypropylene to form a unitary, sealed seam which is impenetrable by liquid or vapor.

A perforated cover 250 with perforations 252 therethrough is then snap-fitted over the GOR-TEX® layer 200 to protect the GOR-TEX® layer and to prevent touching of the GOR-TEX® layer by fingers which could damage the layer or deposit oil or some other contaminant on the layer. The perforated cover 250 has an annular side flange 254 which snaps beneath an annular shoulder 256 which is unitary with the top 204 of the cover.

Figure 14:
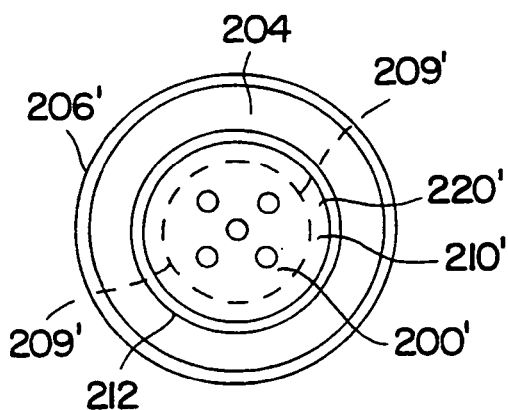
FIG. 14 is a bottom view looking inside of a small cap comprising another embodiment of a cap in accordance with the present invention.
Figure 15:
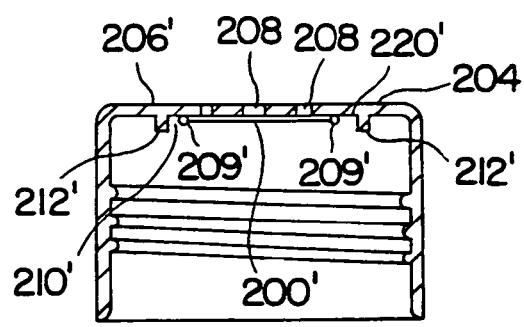
FIG. 15 is a side elevation of the cap of FIG. 14.

Referring now to FIGS. 14 and 15, there is shown a smaller diameter version 206' of the cap 206 of FIGS. 11-13. In this version, similar primed reference numerals identify structure similar to the structure in FIGS. 11-13. The important similar feature is the GOR-TEX® membrane 200' that is thermally bonded in the circular channel 210 by the annular head 230 of an iron 225. In the embodiment of FIGS. 14 and 15, a cover such as the cover 250 is not employed because the cap is relatively small. It is, however, within the scope of this invention to utilize a perforated cover, such as the perforated cover 250, shown in FIG. 13.

Without further elaboration, it is believed that one skilled in the art can, using the preceding description, utilize the present invention to its fullest extent. The following preferred specific embodiment is, therefore, to be construed as merely illustrative, and not limitative of the remainder of the disclosure in any way whatsoever.

EXAMPLE

Draining process pipes and tanks at nuclear facilities that contain as much as 140 g/l of plutonium in aqueous hydrochloric and nitric acid solutions provides a challenge for interim storage. As the pipes and tanks are drained into poly bottles for interim storage until permanent solidification or immobilization may be conducted, the solutions are stored in 1 gallon, high density, polyethylene bottles with polypropylene caps. It has been observed that radiolytic effects, specifically, hydrogen gas generates pressures the bottles which accelerates embrittlement of the bottles.

In accordance with the present invention, hydrogen gas is safely vented from the bottles through a GOR-TEX® membrane which is permeable to vapors, yet impermeable to liquids. The membranes are mounted in pressure equalization caps which provides gas diffusion, yet retain liquids in the bottles in the event that the bottles capsize. The GOR-TEX® membranes are thermally bonded to the inside of the cap in accordance with the present invention and provide caps which are physically durable and chemically resistant to the severe acid conditions of the liquid waste in the bottles.

It has been found that GOR-TEX® membranes thermally sealed to the poly-propylene caps tolerate acidic vapors and withstand liquid head pressure of about 0.92 psi after 40 days of exposure to the acids within the bottles.

Compatibility tests performed show that the pressure equalization caps which had been exposed to 50% 6N nitric acid with 50% 6N hydrochloride acid withstood a 26 inch water column leak test with no visible degradation or change in the GOR-TEX® membrane. The only change in the cap is a yellowish/brownish discolorization thereof.

When the caps were exposed to hydrochloric acid, no sign of degradation occurred and, when leak testing using a 20 inch water column, the cap proved leak-proof for 18 hours. Exposing the caps to nitric acid also showed no signs of degradation and proved leak-proof using a 26 inch water column for over 23 hours. The pressure equalization vents comprised of GOR-TEX® thermally bonded to the interior of polyurethane caps on polyethylene bottles containing plutonium in acid solutions increases the use for life of the bottles. The GOR-TEX® membranes which are permeable to gases, yet impermeable to liquids, allow hydrogen to diffuse at a rate well above the TRUPACT-II minimum requirement of 1.9 E-6 mole/mol frac/sec. Moreover, such GOR-TEX® pressure equalization vents, thermally bonded to the caps, assure ambient pressure within the polyethylene bottles.

EXAMPLE 2

Six pressure equalization caps were prepared by thermally fusing GOR-TEX® membrane to the interior of the polypropylene cap. The non-woven polyester backing was on the clean side, and the expanded PTFE faced the acid solution. The caps were affixed to a bottle containing the designated test acid mixture. After allowing the caps to vent the bottles for a minimum of 40 days, each was tested to water entry at a pressure of 0.92 PSI (26" water column). None of the caps showed adverse degradation after compatibility testing, and none experienced water entry at the specified pressure.

No adhesive will sufficiently bond between the PTFE and most other polymeric materials—especially in an adverse environment such as acid hydrochloric and nitric acids.

| PRESSURIZED WATER LEAK TEST RESULTS - AFTER ACID EXPOSURE | | | | |
| --- | --- | --- | --- | --- |
| | ACID COMPATIBILITY | | 0.93 PSI LIQUID PRESSURE | |
| SAMPLE I.D. | Test Mid Makers | Duration | LEAK TEST | WATER ENTRY |
| 001-42-2-2 | 6.0N HNO$_3$ | 92 days | 122 hrs | None |
| 001-42-2-4 | 6.0N HCL | 90 days | 18 hrs | None |
| 001-45-3-1 | HCL | 42 | 9 hrs | None |
| 001-45-3-2 | HNO$_3$ | 41 | 16.5 hrs | None |
| 001-45-3-3 | 50 6.0N HCL 50 6.0N HNO$_3$ | 41 | 8.5 hrs | None |
| 001-45-3-4 | 50 6.0N HNO$_3$ 50% 6.0N HCL | 44 | hrs | None |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A vent for a container, said vent being permeable to gas or vapor but impermeable to liquid, the vent comprising:
   a stiff substrate of polymer material, the substrate having an array of discrete through holes therethrough in spaced relation to one another to define the areas therebetween;
   a membrane comprised of a first layer of porous polytetrafluoroethylene, a thin layer of a thermoplastic bather polymer having a consistent thickness, a second layer of porous polytetrafluoroethylene, and a fabric layer adhered to one of the layers of porous polytetrafluoroethylene wherein the membrane is thermally bonded to at least one side of the substrate with a thermal bond that includes bonding in the areas between the through holes, the thermal bond being an interface between the substrate and membrane which is direct and free of adhesive.

2. The vent of claim 1, wherein the polymer material of the substrate is selected from the group consisting of polyurethane, polypropylene, polyethylene and fiber reinforced polymers.

3. The vent of claim 2, wherein the polymer material of the substrate is a unitary mass.

4. A vented container for containing acidic solutions of a radioactive material, the container comprising:
 a bottle of a polymer material having an opening;
 a closure for the opening comprising a vent of claim 1.

5. The vented container of claim 4, wherein the container body is polyethylene and the closure is of polypropylene.

6. The vented container of claim 5 further including the contents thereof, wherein the contents thereof comprises plutonium in an acidic solution.

7. The vented container of claim 5, wherein the acidic solution is a solution of aqueous hydrochloric acid.

8. The vented container of claim 6, wherein the acidic solution is an aqueous solution of nitric acid.

9. The vent of claim 1, further including an annular rib surrounding the array of discrete through-holes, wherein the polytetrafluoroethylene membrane has a peripheral portion which extends beyond the annular rib and wherein the polytetrafluoroethylene membrane is bonded to the substrate of polymer material in an area radially external to the annular rib.

10. The vent of claim 9 further including a second annular rib surrounding the first annular rib to define a circular channel therebetween, the circular channel receiving the peripheral portion of the polytetrafluoroethylene membrane which is bonded to the substrate.

11. A vent for venting gas through an opening in the wall of a container, the vent comprising:
 a base having a perforated portion with an array of discrete through holes therein;
 a cover having an area with an array of discrete through holes therein;
 a membrane comprised of a first layer of porous polytetrafluoroethylene, a thin layer of a thermoplastic bather polymer having a consistent thickness, a second layer of porous polytetrafluoroethylene, and a fabric layer adhered to one of the layers of porous polytetrafluoroethylene wherein the membrane is thermally bonded to at least one of the areas having an array of discrete through holes therein over a direct interface between the membrane and the area, which direct interface is adhesive-free.

12. The vent of claim 11 further including a block of filter material disposed between the cover and the base, wherein the block of filter material is a barrier to the passage of solid particles through the vent, the membrane comprised of a first layer of porous polytetrafluoroethylene, a thin layer of a thermoplastic bather polymer having a consistent thickness, a second layer of porous polytetrafluoroethylene, and a fabric layer adhered to one of the layers of porous polytetrafluoroethylene wherein the membrane permits passage of gas or vapor through the vent and preventing passage of liquid therethrough.

13. The vent of claim 12, wherein the base and cover clamp therebetween material of the container with which the vent is used.

* * * * *

UNITED STATES PATENT AND TRADEMARK OFFICE
CERTIFICATE OF CORRECTION

PATENT NO.      : 8,758,488 B1  
APPLICATION NO. : 13/373755  
DATED           : June 24, 2014  
INVENTOR(S)     : Terry J. Wickland Page 1 of 1

It is certified that error appears in the above-identified patent and that said Letters Patent is hereby corrected as shown below:

In the Claims

Column 6, line 67 claim 1, reads "rafluoroethylene, a thin layer of a thermoplastic bather", should read --rafluoroethylene, a thin layer of a thermoplastic barrier--;

Column 8, line 13 claim 11, reads "rafluoroethylene, a thin layer of a thermoplastic bather", should read --rafluoroethylene, a thin layer of a thermoplastic barrier--;

Column 8, line 27 claim 12, reads "bather polymer having a consistent thickness,", should read --barrier polymer having a consistent thickness,--.

Signed and Sealed this  
Twelfth Day of May, 2015

Michelle K. Lee  
*Director of the United States Patent and Trademark Office*